United States Patent
Tuji et al.

(10) Patent No.: US 6,909,892 B2
(45) Date of Patent: Jun. 21, 2005

(54) MOBILE PHONE AVOIDING SEARCH OF INEFFECTIVE BASE STATIONS

(75) Inventors: Hirokazu Tuji, Tokyo (JP); Eiki Kouroki, Kanagawa (JP); Kazuhiko Takeno, Kanagawa (JP); Naoki Naruse, Kanagawa (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 451 days.

(21) Appl. No.: 09/858,703

(22) Filed: May 16, 2001

(65) Prior Publication Data

US 2001/0044298 A1 Nov. 22, 2001

(30) Foreign Application Priority Data

May 17, 2000 (JP) ........................ 2000-145308

(51) Int. Cl.$^7$ ........................ H04M 11/00; H04Q 7/20
(52) U.S. Cl. ................ 455/421; 455/550.1; 455/552.1; 455/566; 455/557
(58) Field of Search ..................... 455/432.1, 432.2, 455/432.3, 422.1, 456.1, 457, 557, 425, 550.1, 552.1, 566, 421

(56) References Cited

U.S. PATENT DOCUMENTS

| 5,613,213 A | | 3/1997 | Naddell et al. |
| 5,737,703 A | | 4/1998 | Byrne |
| 6,085,110 A | * | 7/2000 | Nilsson .................... 455/552.1 |
| 6,148,180 A | * | 11/2000 | Sato ......................... 455/67.7 |

FOREIGN PATENT DOCUMENTS

| EP | 0 781 064 A2 | 6/1997 |
| EP | 0 793 395 A2 | 9/1997 |
| GB | 2327016 A | 1/1999 |
| WO | 96/38992 | 12/1996 |
| WO | 99/30479 | 6/1999 |

* cited by examiner

*Primary Examiner*—William Trost
*Assistant Examiner*—Meless Zewdu
(74) *Attorney, Agent, or Firm*—Scully, Scott, Murphy & Presser

(57) ABSTRACT

When a mobile phone is out of an area covered by a communication currently in use, the fact is noticed to a user and, simultaneously therewith, a message urging the user to select another communication system is displayed. During a period in which this display is performed, it becomes possible to switch the communication system through a simple procedure.

3 Claims, 4 Drawing Sheets

```
System A is Out of Area.
Search System B Network ?
YES : (1)      NO : (2)
```

FIG.4

```
System B is Out of Area.
Search System A Network ?
YES : (1)      NO : (2)
```

FIG.5

MOBILE PHONE AVOIDING SEARCH OF INEFFECTIVE BASE STATIONS

BACKGROUND OF THE INVENTION

1. Field of the Invention

The present invention is utilized in a mobile phone service in an area covered by a plurality of different communication systems in mixed state. The present invention is commonly utilized in a plurality of different areas covered by different communication systems.

2. Description of Related Art

In an area covered by different communication systems providing respective mobile phone services, it is possible to improve a convenience of a user of a mobile phone by making the mobile terminal possible to correspond to a plurality of communication systems.

Alternatively, in a case where a user of a mobile phone reciprocates between a plurality of areas covered by different communication systems, a convenience of the user can be improved by corresponding the mobile phone to the respective communication systems.

In Japan, for example, a composite type mobile phone capable of operating in PDC (Personal Digital Cellular) mobile phone system or PHS (Personal Handy-phone System) selectively has been used. The composite type mobile phone includes a plurality of circuits corresponding to different communication systems, respectively, and operates by selecting one of the circuits.

The selection of circuit is manually performed by a user or automatically performed by the mobile phone itself. In the case of the automatic selection, the mobile phone determines one of the communication systems, which is employed in an area in which the mobile phone exists, and automatically selects one of the circuits.

Further, there is a composite type mobile phone capable of corresponding to the communication systems used in both Japan and other countries.

When a communication system is automatically selected by such conventional composite type mobile phone, there is no problem if a user of the mobile phone is in an area covered by any of the communication systems and the communication system covering the area is selected. However, when the user is out of areas covered by these communication systems, there is a problem in view of battery saving. That is, in such case, it is necessary for the mobile phone to repeatedly search base stations of all communication systems, so that a battery life of the mobile phone is shortened.

On the other hand, in a case where there is difference in charging system between communication systems, there may be a case where a communication system, which is not requested by a user, is automatically selected and the user is charged by an amount exceeding his expectation.

In the case where a communication system is manually selected by a user, there may be a case where the user can not accept a mobile phone service if he forgets a communication system he wants to use or he erroneously selects a wrong communication system.

Further, the manual operation for selecting the communication system is generally not easy. This is because, in order to avoid an interruption of communication when a communication system in use is switched to another by erroneous operations of buttons and/or switches of a mobile phone by a user during the communication, the selecting operation of communication system must be performed through a plurality of steps. When a user forgets the communication selecting operation requiring a plurality of steps, the user must re-confirm a manual, which is troublesome. That is, it is very troublesome for the user to check a communication system corresponding to his location and manually switch a communication system in use to another.

SUMMARY OF THE INVENTION

The present invention was made in view of such background and has an object to provide a mobile phone, which is capable of avoiding the necessity of search for ineffective base stations and reducing battery power consumption.

Another object of the present invention is to provide a mobile phone with which a communication system can be selected according to an intention of a user.

Another object of the present invention is to provide a mobile phone capable of selecting a communication system free from erroneous operation of a user.

A further object of the present invention is to provide a mobile phone with which a user can select a communication system through a simple operation.

The mobile phone according to the present invention is featured by that, when a user is out of an area covered by a communication system currently in use, the mobile phone notifies the user of the fact and displays a message for urging the user to select another communication system. The display of message is performed by characters and/or voice. It is preferable that a determination of whether or not the mobile phone is within an area covered by the communication system currently in use is continuously performed from a time at which a power source of the mobile phone is turned on and it is preferable that, when a search for a base station of the communication system currently selected becomes impossible, the message is displayed.

Therefore, it is possible to avoid a search of a base station, which becomes ineffective, when the mobile phone is in an area not covered by any communication system. Consequently, it is possible to avoid unnecessary power consumption of a battery of the mobile phone. Further, it is possible to avoid a selection of a communication system against an intention of a user. In addition, by displaying a message urging the user to select another communication system, it is possible to avoid an erroneous operation of a user caused by user's forgetfulness of selection or erroneous selection.

It is preferable that, when the message is displayed, the mobile phone becomes in a state ready for communication system selection in which a switching of the communication system can be done by the user through a simple operation. In such case, the user can switch the communication to another through, for example, a single step of operation. Therefore, the switching operation is not troublesome and there is no procedure for re-confirming a manual when the user forgets the operation manner.

In the case where the present invention is applied to the composite type mobile phone usable for communication systems used in Japan and in other countries, the message is displayed on the mobile phone and the mobile phone becomes in the communication system selection state, by turning the power switch of the mobile phone on at a time when the user reaches a foreign country employing a communication system different from the domestic communication system. Therefore, the user can select the communication system employed in the foreign country by the simple operation.

That is, the present invention resides in the mobile phone comprising a plurality of circuits corresponding to different communication systems, respectively, and means for selecting one of the circuits according to an operation input.

According to another aspect of the present invention, the mobile phone is featured by comprising means for determining whether or not the mobile phone is out of the area covered by the currently selected communication system and display means, which, when it is determined as out of the area, displaying a message notifying the user of the fact and urging the user to select another communication system.

It is preferable that the mobile phone comprises switching means for determining, whether the message is displayed every time when the mobile phone moves out from the area covered by a communication system or every time when the power source of the mobile phone is turned on.

The mobile phone preferably comprises means for putting the switching means in the switch ready state upon the display of the message. The means for putting the switching means in the switch ready state preferably comprises means for switching the communication system through a single step of operation.

BRIEF DESCRIPTION OF THE DRAWINGS

Specific embodiments of the present invention will now be described, by way of example only, with reference to the accompanying of drawings in which:

FIG. 4 shows an example of a content of display of the mobile phone; and

FIG. 5 shows another example of a content of display of the mobile phone.

DETAILED DESCRIPTION OF THE PREFERRED EMBODIMENTS

Figure 1:
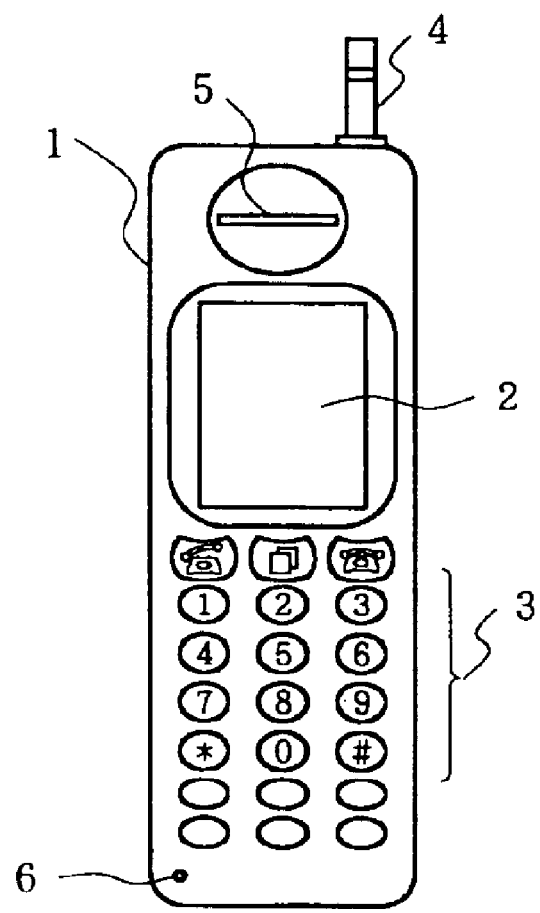
FIG. 1 is a front view of a mobile phone according to an embodiment of the present invention.
Figure 2:
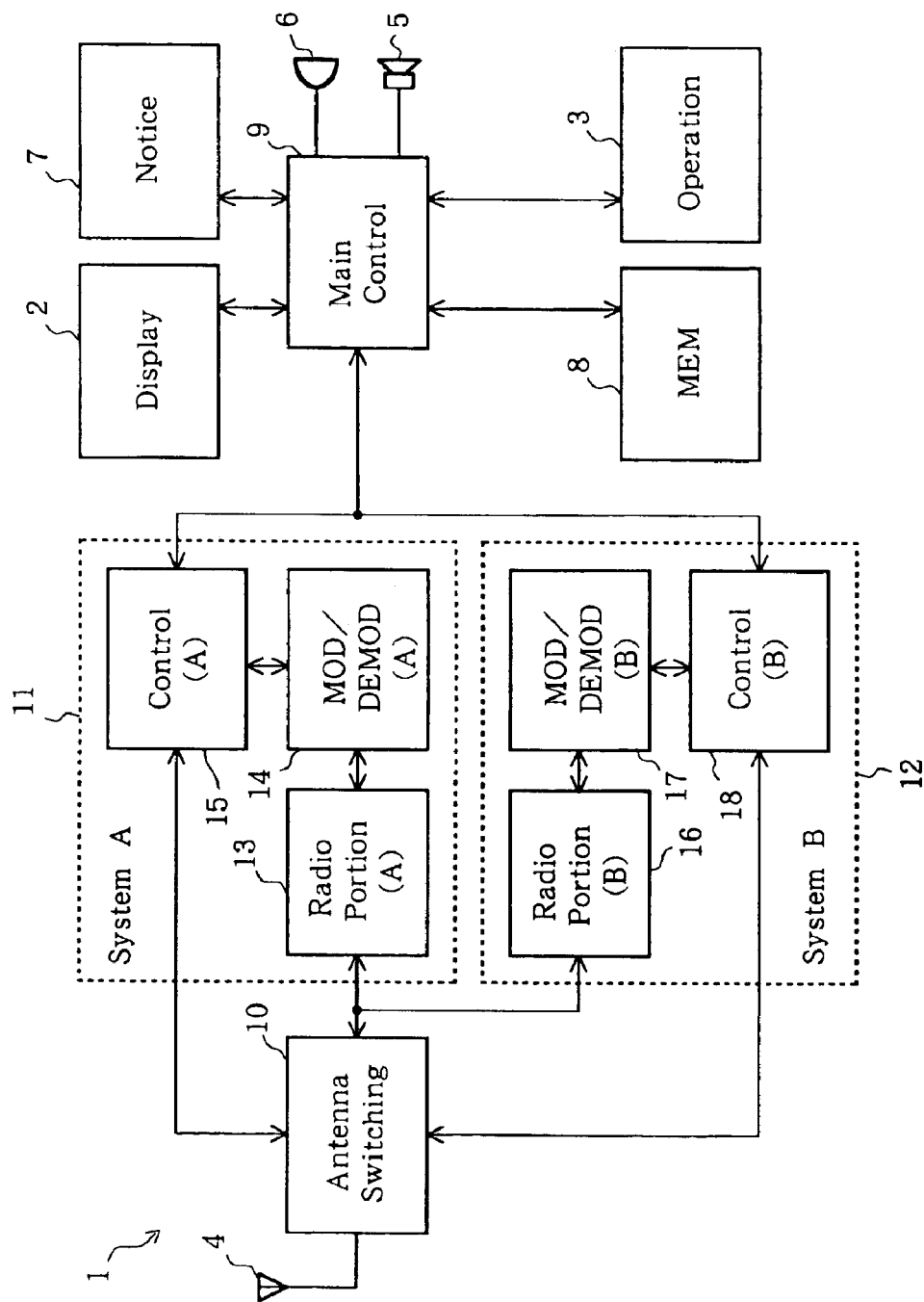
FIG. 2 is a block circuit diagram of the mobile phone according to an embodiment of the present invention.
Figure 3:
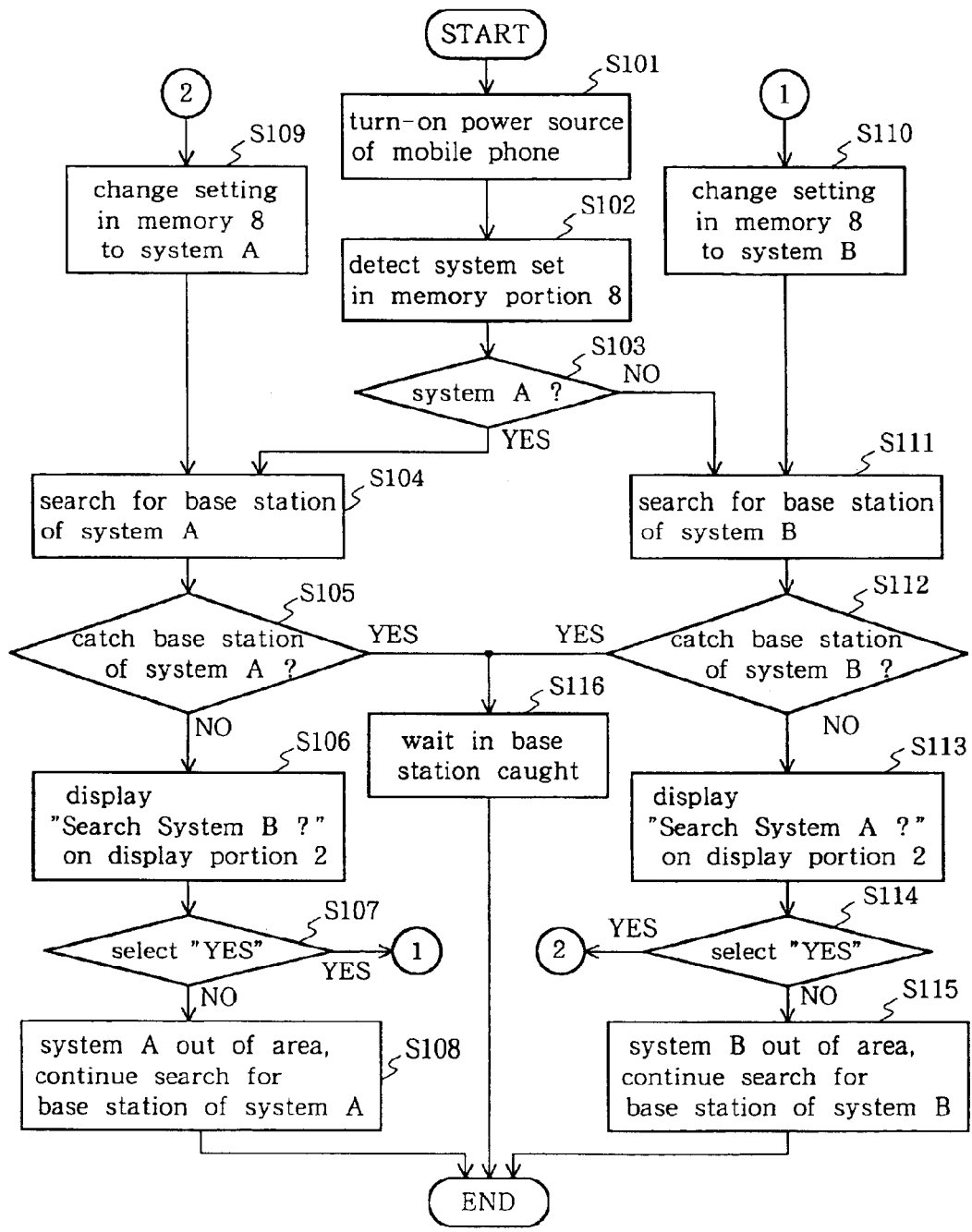
FIG. 3 is a flowchart showing an operation of the mobile phone shown in FIG. 2.

An embodiment of the present invention will be described with reference to FIG. 1 to FIG. 5, in which FIG. 1 is a front view of a mobile phone according to an embodiment of the present invention, FIG. 2 is a block circuit diagram of the mobile phone according to the embodiment of the present invention, FIG. 3 is a flowchart showing an operation of the mobile phone shown in FIG. 2, FIG. 4 shows an example of a content of display of the mobile phone and FIG. 5 shows another example of a content of display of the mobile phone.

A mobile phone 1 according to an embodiment of the present invention includes a display portion 2 on which telephone numbers and various information are displayed as shown in FIG. 1. An operation portion 3 of the mobile phone 1 is used to perform a calling operation and various setting operations. An antenna 4 transmits and receives electromagnetic wave for a communication with respect to a base station. A receiver portion 5 outputs a sound signal and a sound signal is inputted to a microphone portion 6.

As shown in FIG. 2, the mobile phone 1 comprises a pair of circuit portions 11 and 12 corresponding to a communication system A and a communication system B, respectively, and a main control portion 9, which is means for selecting one of the circuit potions 11 and 12 according to an operation input from the operation portion 3. The circuit portion 11 corresponding to the communication system A includes a radio portion 13, a modulation/demodulation portion 14 and a control portion 15 and the circuit portion 12 corresponding to the communication system B includes a radio portion 16, a modulation/demodulation portion 17 and a control portion 18.

Each of the control portions 15 and 18 is featured by including the display portion 2 and a notice portion 7 as display means for determining whether or not the mobile phone is out of an area in which the currently selected communication system is employed and, when the mobile phone is out of the area, displaying the fact and a message urging a user to select another communication system. The display portion 2 displays a character information to the user, as shown in FIG. 4 or FIG. 5.

An information display pattern of the information is stored in a memory 8. Further, the communication system currently in use is stored in the memory portion 8.

Now, an operation of the mobile phone according to the embodiment of the present invention will be described with reference to FIG. 3 to FIG. 5. Assuming that a network in the area in which the user currently exists is covered by the communication system A, an information "communication system to be used is A" is stored in the memory portion 8 by operating the operation portion 3. In this case, the main control portion 9 sets an antenna switch circuit 10 through the control portion 15 such that the antenna 4 is connected to the radio portion 13 to make the mobile phone 1 possible to perform a communication using the communication system A.

In this state, the mobile phone 1 is in a state waiting for a call of only the communication system A. Even if the user moves out of the area covered by the communication system A, a network search of the communication system B is not performed.

On the other hand, in a case where the communication system of a network in an area in which the user currently exists is B, an information "communication system to be used is B" is stored in the memory portion 8 by operating the operation portion 3. In this case, the main control portion 9 sets the antenna switch circuit 10 through the control portion 15 such that the antenna 4 is connected to the radio portion 16 to make the mobile phone 1 possible to perform a communication using the communication system B. In this state, the mobile phone 1 is in a state waiting for a call of only the communication system B. Even if the user moves out of the area covered by the communication system B, a network search of the communication system A is not performed.

When the user moves from the area covered by the communication system A to the area covered by the communication system B, it is necessary to change the information of the communication system B stored in the memory portion 8 to the communication system A by operating the operation portion 3.

In this embodiment of the present invention, the search operation for the base station of the communication system set in the memory portion 8 is performed when the power source of the mobile phone 1 is turned on and, when the base station can not be caught, that is, the mobile phone 1 is out of an area covered by the same communication system, a message as to whether or not the other communication system is to be searched is displayed in the display portion 2. In a case where the user operates the operation portion 3 to perform the network search of the other communication system, the main control portion 9 changes the information of one communication system stored in the memory portion 8 to the other communication system and, simultaneously therewith, the main control portion 9 sets the antenna switch circuit 10 through the control portion 18 such that the antenna 4 is connected to the radio portion 16 to make the mobile phone 1 possible to perform a communication using the other communication system and immediately starts the network search operation of the other communication system.

In this state, the user is required to push one of keys of the operation portion 3 only once according to the message displayed on the display portion 2, so that the user can switch the communication system from one to the other through the very simple operation.

In a state where the message as to whether or not the search of the other communication system is performed is not displayed on the display portion 2, the switching of the communication system is not required. Although, when the user wishes to switch the communication system for some reason in such case, the user must do it through a plurality of operation steps, which may cause erroneous switching of the communication system to occur. The above system can avoid such erroneous switching of the communication system.

FIG. 4 shows an example of the message to be displayed on the display portion 2 in a case where the search operation for the base station of the communication system (in this case, communication system A) set in the memory portion 8 is performed when the power source of the mobile phone 1 is turned on and the base station can not be caught, that is, the mobile phone 1 is out of an area covered by the same communication system. When the user pushes a button 1 of the operation portion 3 in the state in which this message is displayed, the mobile phone 1 performs the switching operation to the communication system B. On the other hand, when the user pushes a button 2 of the operation portion 3, the search operation for the base station of the communication system A is continued while the mobile phone is out of the area covered by the communication system A. It should be noted that this button operation is a mere example and the button operating manner depends upon a specification of the mobile phone 1.

FIG. 5 shows an example of the message to be displayed on the display portion 2 in a case where the search operation for the base station of the communication system (in this case, communication system B) set in the memory portion 8 is performed when the power source of the mobile phone 1 is turned on and the base station can not be caught, that is, the mobile phone 1 is out of an area covered by the same communication system. When the user pushes the button 1 of the operation portion 3 in the state in which this message is displayed, the mobile phone 1 performs the switching operation to the communication system A. On the other hand, when the user pushes the button 2 of the operation portion 3, the search operation for the base station of the communication system B is continued while the mobile phone is out of the area covered by the communication system B. It should be noted that this button operation is a mere example and the button operating manner depends upon a specification of the mobile phone 1.

The operation of the mobile phone 1 when the power source thereof is turned on will be described with reference to the flowchart shown in FIG. 3. When the power source of the mobile phone 1 (step S101), the mobile phone 1 detects the information of communication system set in the memory portion 8 thereof (step S102).

When the information thus detected is the communication system A (YES in step S103), the mobile phone 1 performs a search operation for the base station of the communication system A (step S104).

When the base station of the communication system A could be caught by the mobile phone 1 (YES in step S105), the mobile phone 1 performs a waiting operation of a communication of the communication system A with respect to the base station (step S116).

In a case where the base station of the communication system A could not be caught by the mobile phone 1 (NO in step S105), the message "system B network search?" such as shown in FIG. 4 is displayed on the display portion 2 (step S106) and, when the user operates the operation portion 3 to select "YES" (step YES in step S107), the mobile phone 1 changes the information in the memory portion 8 to the communication system B (step S110) and then starts a search for a base station of the communication system B (step S111).

When "NO" is selected in the step S107 (NO in step S107), the mobile phone 1 continues the base station search for the base station of the communication system A while it is out of the area covered by the communication system A (step S108).

On the contrary, when, as a result of the communication system detection in the step S102, the detected information is the communication system B (NO in step S103), the mobile phone 1 performs a search for the base station of the communication system B (step S111). When, as a result of the search, the base station of the communication system B could be caught by the mobile phone 1 (YES in step S112), the mobile phone 1 performs a waiting operation for a communication of the communication system B with respect to the thus caught base station (step S116).

On the contrary, when, as a result of the search for the communication system B, the base station could not be caught by the mobile phone 1 (NO in step S112), the message "system A network search?" such as shown in FIG. 5 is displayed on the display portion 2 (step S113) and, when the user operates the operation portion 3 to select "YES" (step YES in step S114), the mobile phone 1 changes the information in the memory portion 8 to the communication system A (step S109) and then starts a search for a base station of the communication system A (step S104).

When the NO is selected in the step 114, the search for the base station of the communication system B is continued while the mobile phone 1 is out of the area covered by the communication system B (step S115).

The flowchart shown in FIG. 3 is set such that it is executed every time when the power source of the mobile phone 1 is turned on. However, it is possible to set the flowchart such that the flow subsequent to the step S101 in FIG. 3 is executed every time when the mobile phone 1 moves out from an area covered by a certain communication system. It is possible to program such that the user can select either one of the flowchart settings arbitrary by using the operation portion 3.

The circuitry shown in FIG. 2 can be modified variously. For example, the main control portion 9 may be included in one of the circuit portions 11 and 12 to control the other as a slave circuit. This invention should not be limited by such a circuitry.

In this embodiment, the present invention has been described with reference to the complex type mobile phone corresponding to the communication systems A and B. However, the present invention can be applied to a composite type mobile phone corresponding to three or more communication systems.

As described hereinbefore, according to the present invention, it is possible to avoid a search for a base station, which becomes ineffective to thereby restrict power consumption of a battery power source. Further, it is possible to select one of communication systems according to an intention of a user of the mobile phone. Further, it is possible to select one of communication systems without erroneous operation of a user. In addition, a user of the mobile phone can select one of communication systems through a simple manual operation.

What is claimed is:

1. A mobile phone comprising:

a plurality of circuits each corresponding to a different communication system;

means for selecting one of the plurality of said circuits according to a manual input operation;

means for determining whether or not said mobile phone is out of an area covered by a communication system currently in use;

display means for displaying, when said mobile phone is out of said area, the latter fact together with a message urging a user of said mobile phone to select another communication system; and means for permitting a user to select between (a) displaying of said message every time that said mobile phone moves out from said area and (b) displaying of said message every time that a power source of said mobile phone is turned on.

2. A mobile phone as claimed in claim 1, further comprising means for making said user permitting display selection means in a switching ready state simultaneously with the display of said message.

3. A mobile phone as claimed in claim 2, wherein said means for making includes means for switching a communication system through a single manual operation step.

* * * * *